United States Patent [19]

Kingston

[11] Patent Number: 4,499,142
[45] Date of Patent: Feb. 12, 1985

[54] FACED MASONRY UNITS AND FACING COMPOSITION THEREFOR

[75] Inventor: Alan C. Kingston, Emigsville, Pa.

[73] Assignee: Trenwyth Industris, Inc., Emigsville, Pa.

[21] Appl. No.: 480,897

[22] Filed: Mar. 31, 1983

[51] Int. Cl.³ .................. B32B 13/12; B32B 5/16; B32B 27/36

[52] U.S. Cl. .................. 428/331; 428/454; 428/447; 428/480; 428/500; 428/702; 428/921

[58] Field of Search .............. 428/331, 454, 447, 480, 428/500, 702, 921

[56] References Cited

U.S. PATENT DOCUMENTS

| | | | |
|---|---|---|---|
| 2,751,775 | 6/1956 | Sergovic | 428/331 X |
| 2,817,619 | 12/1957 | Bickel et al. | 428/331 X |
| 2,861,011 | 11/1958 | Asbeck et al. | 428/331 X |
| 3,632,725 | 1/1972 | Jones | 428/331 X |
| 4,263,372 | 4/1981 | Emmons et al. | 428/454 X |

*Primary Examiner*—George F. Lesmes
*Assistant Examiner*—Nancy A. B. Swisher
*Attorney, Agent, or Firm*—Bernard, Rothwell & Brown

[57] ABSTRACT

An unsaturated polyester resinous filled facing composition for use on masonry units such as concrete building blocks having improved flame spread retardance and low smoke production ratings, in addition to superior chemical, stain and water resistance. Isophthalic neopentyl glycol polyester is used and dimethyl methyl phosphonate is incorporated to provide the improved flame and smoke suppression.

6 Claims, No Drawings

FACED MASONRY UNITS AND FACING COMPOSITION THEREFOR

BACKGROUND OF THE INVENTION

1. Field of the Invention

The present invention relates to polyester resin-based facing compositions intended for use in forming coatings on building units and more particularly on masonry units such as concrete building blocks. The facing compositions of this invention are characterized by having improved flame spread retardance ratings and by having unusually low smoke production rates when subjected to elevated temperatures. The invention also embraces the method of producing faced masonry units which are chemical resistant, stain resistant and resistant to mottling (uneven discoloration) when subjected to long periods of exterior exposure.

2. Prior Art

Numerous resin-based compositions and formulations have previously been proposed for coating and molding applications. Resin-based compositions have been proposed containing numerous types of additives such as pigments, fillers, fire retardants and ultra-violet light stabilizers for purposes such as strength improvement, shrinkage, reduction of ultra-violet discoloration, fire resistance, wear resistance, weather resistance, chemical resistance and the like.

Many of these previously proposed facing compositions have, however, suffered from disadvantages such as high cost and somewhat restricted and transient effectiveness in the intended purposes. For example, U.S. Pat. No. 4,031,289 discloses a coating composition using triethyl phosphate as the preferable fire retardant when methyl methacrylate is used as the monomer. I have found that triethyl phosphate has severe limitations as a fire retardant because it does not become part of the cross-linked polymerized composition. Rather it is merely trapped in the cross-linking and because of its high volatility and poor stability tends to migrate to the surface and evaporate over a period of time. This is particularly true when the faced masonry blocks are used on the exterior of buildings and subjected to the weather. When the triethyl phosphate evaporates from the surface of the facing, it leaves microscopic holes in the surface which cause dirt and other contaminants to become trapped therein giving the finished surface an unattractive mottled appearance. The final result is that not only is the original flame and smoke retardance lost but the facing loses its decorativeness, cleansability and low moisture absorption.

Accordingly, there is a need in the art to provide a facing composition and faced building units such as concrete blocks having particularly good permanent flame spread retardance and low smoke production ratings, while maintaining the attractive decorative characteristics and chemical stain and weather resistance.

SUMMARY OF THE INVENTION

The present invention is based on the findings that a facing composition can be prepared, and faced building blocks produced, which have an exceptionally useful combination of properties by the use of a filler composition including a blend of silica sand and particulate alumina trihydrate both of which have been surface-treated with silane bonding agents in certain unsaturated polyester resins compounds containing inter alia methyl methacrylate as a monomer and dimethyl methyl phosphonate as a flame and smoke suppressant.

DETAILED DESCRIPTION OF THE PREFERRED EMBODIMENT

Before identifying the compositions, methods and faced products of the present invention in greater detail, it should perhaps be explained that the facing compositions of this invention can be used on different substrates such as blocks and bricks or they can be used to form cast articles without backing.

The unsaturated polyester resin used in a facing composition of the present invention can broadly be defined as deriving from a reaction between an unsaturated polycarboxylic acid and a polyhydric alcohol, and at least one cross-linking monomer. Suitable unsaturated polyesters and cross-linking monomers will be identified in greater detail hereinafter.

A facing composition of this invention is characterized by containing from about 60 to about 90 percent by weight of the filler composition based on the total weight of the resin plus the filler composition. The compositions of this invention are further characterized by the inclusion of particulate alumina trihydrate, such particulate alumina trihydrate being present in such a composition to an extent of at least 2% by weight based on the total weight of the composition, i.e., the total weight of the unsaturated polyester, the cross-linking monomer or monomers and the filler composition (silica sand plus alumina trihydrate plus any other components of such filler composition, all surface-treated with silane bonding agent). Accordingly, a facing composition in accordance with the present invention can broadly be defined as comprising from about 10 to about 40% by weight of an unsaturated polyester resin which comprises an unsaturated polyester of an unsaturated polycarboxylic acid and a polyhydric alcohol and at least one cross-linking monomer, and from about 60 to about 90% by weight of a filler composition including silica sand and particulate alumina trihydrate, this particulate alumina trihydrate being present to an extent of at least 2% by weight (and preferably less than 5%) by weight based on the total weight of the coating composition, and the particulate alumina trihydrate having a particle size distribution such that a major portion by weight thereof passes through a #325 U.S. standard sieve. The unsaturated polycarboxylic acids present in the unsaturated polyesters used in the compositions of this invention are the ethylene dicarboxylic acids (maleic and fumaric acids).

The saturated polycarboxylic acid present in the unsaturated polyesters used in the compositions of this invention is isophthalic acid.

The polyhydric alcohol present in the unsaturated polyesters used in the compositions of this invention is neopentyl glycol.

The cross-linking monomers used in the compositions of this invention are styrene and methyl methacrylate.

Particularly useful compositions in accordance with the present invention have been prepared by the combined use of styrene and methyl methacrylate as the cross-linking monomers. It has been found that substantial reduction in smoke production at elevated temperatures can be obtained when such particular cross-linking monomer mixtures are used to the extent of from about 55 to about 75% by weight based on the weight of the unsaturated polyester, when the amount of methyl methacrylate is from about 25 to about 50% by weight based upon the combined weight of the styrene plus the methyl methacrylate and when dimethyl methyl phosphonate is used in amounts from about 4 to about 12% by weight based upon the combined weight of the unsaturated polyester plus the cross-linking monomers plus the dimethyl methyl phosphonate, or about 0.7% to about 2% of the total weight of the facing composition, and preferably about 1%.

To effect the cross-linking and hardening of the polyester resins in the compositions of the invention, it is generally necessary to employ a free radical catalyst. Free radical catalysts for this purpose include conventional organic peroxides such as benzoyl peroxide, methyl ethyl ketone peroxide, hexyl peroxide and 2,5-Dimethyl-5-bis(2-ethyl hexol peroxy)Hexane (commercially available as U.S. Peroxygen Catalyst No. 245). The amounts of catalyst which are used can vary quite widely. For example, from about 0.1% to about 5% by weight of the unsaturated polyester and the monomers. It is, however, preferred to employ from about 0.5% to about 2.5% by weight of the free radical catalyst.

The facing compositions of the present invention may be prepared from their individual components in any appropriate manner. For example, the polyester compound including the cross-linking monomers and the dimethyl methyl phosphonate may first be thoroughly mixed with the selected catalyst. The pigment or pigments are then added and thoroughly blended into the mixture. The inorganic dry components of the filler composition are then added and blended into the mixture successively, usually progressing from the smallest particle size to the largest. The resulting mixture is continuously agitated in a feed tank and after several minutes of mixing, the composition is ready for use. The facing compositions of the invention can be applied to building blocks in any appropriate manner, but facings of a particularly uniform thickness can be obtained by disposing a layer of the facing composition in a mold and positioning the building unit in the mold with the surface thereof disposed in contact with the layer of the facing composition. The mold containing the facing composition with the building unit in contact therewith is then placed in an oven, and the temperature of the facing composition raised to about 280° F. in about 12 to 18 minutes, maintaining the building unit within the mold in contact with the layer of the facing composition until cross-linking of the unsaturated polyester of the facing composition has proceeded to an extent sufficient to bond the layer of facing composition to the surface of the building unit, then removing the building unit from the mold.

EXAMPLES

The invention will now be described in the following examples which are provided merely by way of illustration and in which unless otherwise stated all parts and percentages are by weight.

EXAMPLE 1

A facing composition ws prepared by first mixing the following components to obtain Liquid Compound "A".

| ITEM | COMPONENT | FOOTNOTE | AMOUNT | PERCENTAGE |
|---|---|---|---|---|
| 1. | 7130 Polyester Resin | (a) | 3000.0 lbs. | 63% |
| 2. | Methyl Methacrylate | | 1432.5 lbs. | 30.1% |
| 3. | Dimethyl methyl phosphonate | | 300.0 lbs. | 6.3% |
| 4. | Bentone 38 | (b) | 17.5 lbs. | .37% |
| 5. | Antifoam A | (c) | 9.0 lbs. | .19% |

(a) 7130 is an neopentyl glycol/maleic acid/ isophthalic acid polyester resin manufactured and distributed by Ashland Chemical Company. It contains approximately 40% styrene monomer and 60% solids.
(b) Bentone 38 is an anti-settling agent manufactured and distributed by National Lead Company.
(c) Antifoam A is a silicone anti-foaming agent manufactured and distributed by Dow Chemical Company.

A portion of Liquid Compound "A" was then mixed with the following components to obtain the facing composition.

| ITEM | COMPONENT | FOOTNOTE | AMOUNT | PERCENTAGE |
|---|---|---|---|---|
| 1. | Liquid Compound "A" | | 80.0 lbs. | 18% |
| 2. | Catalyst 245 | (d) | 4.0 lbs. | .9% |
| 3. | Titanium Dioxide | | 0.8 lbs. | .18% |
| 4. | SP 332 | (e) | 12.0 lbs. | 2.7% |
| 5. | Fine Sand Filler | (f) | 65.0 lbs. | 14.6% |
| 6. | Coarse Sand Filler | (g) | 285.0 lbs. | 63.8% |

(d) Catalyst 245 is 2,5-Dimethyl-5-bis (2-ethyl hexoyl peroxy) Hexane catalyst manufactured and distributed by U.S. Peroxygen Division of Witco Chemical Corporation.
(e) SP 332 is a finely divided ground alumina trihydrate and a product of Solem Industries, Inc., with the following chemical analysis:

| | |
|---|---|
| $Al_2O_3$ | 64.9% |
| $SiO_2$ | .02% |
| $Fe_2O_3$ | .02% |
| $Na_2O$ | .25% | and having the following particle-size analysis:

| | |
|---|---|
| Retained on U.S. 325 mesh | 2% |
| Passing U.S. 325 mesh | 98% | median particle diameter 10 to 12 microns.
SP 332 is surface treated with .05% by weight of vinyl-tris (2-methoxyethoxy) silane $CH_2=CHSi(OC_2H_4OCH_3)_3$.

(f) Fine Sand Filler is natural grain white silica sand with the following chemical analysis:

| | |
|---|---|
| $SiO_2$ | 99.88% |
| $Fe_2O_3$ | .02% |
| $Al_2O_3$ | .10% |
| $TiD_2$ | .015% |
| CaO | .015% |
| MgO | .005% | and having the following particle size analysis:

| | |
|---|---|
| Retained on U.S. 50 mesh | 4% |
| Retained on U.S. 70 mesh | 37% |
| Retained on U.S. 100 mesh | 35% |
| Retained on U.S. 140 mesh | 16% |
| Retained on U.S. 200 mesh | 6% |
| Retained on U.S. 270 mesh | 2% | surface treated with .05% by weight of gamma-Methacryloxy-propyltrimethoxysilane

(g) Coarse Sand Filler is a natural grain white silica sand having the same chemical analysis and silane surface treatement as item 5 (footnote (f)) above but having the following particle size analysis:

| | |
|---|---|
| Retained on U.S. 30 mesh | 3% |
| Retained on U.S. 40 mesh | 70% |
| Retained on U.S. 50 mesh | 26% |
| Retained on U.S. 70 Mesh | 1% |

When all the above components had been thoroughly blended together, they became the facing composition. The resulting mixture was then placed in a vitreous enamel mold and compacted by vibration and shaking to ensure minimum voids and accurate conformance to the mold shape to provide a layer having a thickness of about 0.175 inch in the base of the mold. A concrete block was then placed on top of the layer of the facing composition in the mold, its weight pressing it downward into intimate contact with that layer, the dimensions of the undersurface of the block being approximately 16 inches by 8 inches. The entire assembly consisting of the concrete block, the facing composition layer and the mold were then placed in a thermostatically controlled oven set at 400° F. for 16 minutes. The block was then removed from the mold and it was found that the block had a cross-linked facing firmly bonded thereto. The facing surface had a glazed white finish.

The facing was found to exhibit excellent stain resistance, chemical resistance, wear resistance and weather resistance. It was also found to have exceptionally good flame spread retardance and very low smoke production at elevated temperatures. The facing was found to meet or exceed all the requirements of the American Society for Testing and Materials Specifications C744—the industry standard specification for faced masonry units—and Federal Specification SS-C-621b Form B—The Federal Government standard specification for faced masonry units, immediately after manufacture and also after 1000 hours of simulated exterior exposure (equivalent to three years).

EXAMPLE 2

A facing composition was prepared in the manner described in Example 1 except that Component No. 3 of the Liquid Compound "A"—the dimethyl methyl phosphonate—was omitted and the methyl methacrylate—Component No. 2—was increased to 1732.5 lbs. Using the same procedure as described in Example 1, the mixed composition was applied to a concrete block and the cured facing so obtained was evaluated for flame spread retardance and smoke production. In both of these factors the facing was rated "bad", i.e., it exceeded the maximum allowable limits of the specifications ASTM C744 and SS-C-621b for flame spread and smoke development.

EXAMPLE 3

A facing composition was prepared in the manner described in Example 1 except that Component 3 of the Liquid Component "A"—the dimethyl methyl phosphonate—was omitted and replaced with a similar amount of triethyl phosphate.

Using the same procedures as described in Example 1, the mixed composition was applied to a concrete block and the cured facing so obtained was evaluated in accordance with the forementioned specifications ASTM C744 and SS-C-621b. The facing was rated "acceptable" to "excellent" in all respects when tested immediately after manufacture; but became mottled and dull and failed the staining test and the smoke development test after 1000 hours of simulated exterior exposure.

I claim:

1. A faced masonry unit of the type including a masonry block and a decorative durable facing on at least one surface thereof, the facing being of a composition comprising; a silane surface-treated sand filler in a range of about 60 to 90% of the total weight of the facing composition, an isophthalic neopentyl glycol polyester in a range of about 10 to 40% of the total weight of the facing composition, styrene and methyl methacrylate monomers together with a range of about 5 to 15% of the weight of the total facing composition, alumina trihydrate at least 2% by weight of the total facing composition, and dimethyl methyl phosphonate incorporated into the composition in an amount sufficient to impart permanent flame and smoke suppression to the facing.

2. A faced masonry unit as defined in claim 1, wherein the composition includes the dimethyl methyl phosphonate in a range between 0.7 and 2% of the total weight of the facing composition.

3. A faced masonry unit as in claim 2, wherein the dimethyl methyl phosphonate is about 1% of the total weight of the facing composition.

4. A facing composition as in claim 2, wherein the alumina trihydrate is between about 2 and 5% by weight of the total weight of the facing composition.

5. A faced masonry unit as defined in claim 2, wherein the methyl methacrylate is about 25 to 50% by weight of the combined weight of styrene and methyl methacrylate.

6. A faced masonry unit as in claim 1, wherein the facing is bonded to the surface of the masonry unit during baking in an oven.

* * * * *

UNITED STATES PATENT AND TRADEMARK OFFICE
CERTIFICATE OF CORRECTION

PATENT NO. : 4,499,142
DATED : February 12, 1985
INVENTOR(S) : ALAN C. KINGSTON

It is certified that error appears in the above-identified patent and that said Letters Patent is hereby corrected as shown below:

In the cover page, at block [73], in the assignee information, delete "Trenwyth Industris, Inc." and substitute therefor, --Trenwyth Industries, Inc.--

Signed and Sealed this

Thirtieth Day of July 1985

[SEAL]

Attest:

DONALD J. QUIGG

Attesting Officer     Acting Commissioner of Patents and Trademarks